United States Patent [19]

Tenmyo et al.

[11] 4,354,146
[45] Oct. 12, 1982

[54] DRIVE APPARATUS

[75] Inventors: Shigemoto Tenmyo; Hiroshi Koide, both of Tokyo, Japan

[73] Assignee: Ricoh Company, Ltd., Tokyo, Japan

[21] Appl. No.: 156,823

[22] Filed: Jun. 5, 1980

[30] Foreign Application Priority Data

Jun. 12, 1979 [JP] Japan .................................. 54-73074

[51] Int. Cl.³ .............................................. H02P 5/06
[52] U.S. Cl. .................................... 318/341; 318/313; 318/314; 318/318
[58] Field of Search ................ 324/163; 318/313, 480, 318/640, 314, 318; 364/110, 341

[56] References Cited

U.S. PATENT DOCUMENTS

| | | | |
|---|---|---|---|
| 3,731,176 | 5/1973 | Mitchell et al. | 318/619 |
| 4,054,820 | 10/1977 | Foster | 318/341 |
| 4,066,941 | 1/1978 | Foster et al. | 318/341 |
| 4,153,863 | 5/1979 | Schachte | 318/341 |
| 4,201,936 | 5/1980 | Roumanis | 318/314 |
| 4,218,735 | 8/1980 | McCutcheon | 364/110 |
| 4,228,396 | 10/1980 | Palombo et al. | 324/163 |

Primary Examiner—David Smith, Jr.
Attorney, Agent, or Firm—David G. Alexander

[57] ABSTRACT

An object (12) is moved by a motor (16) at a command speed which is a desired function of time. The current applied to the motor (16) is controlled in accordance with the phase difference between a periodic digital command speed signal and a periodic digital actual speed feedback signal. The two digital signals are applied in combination as an address input to a memory (67) which stores in the addresses thereof digital drive signals having magnitudes which are predetermined in accordance with the phase difference. The current applied to the motor (16) is proportional to the magnitude of the addressed drive signal.

4 Claims, 11 Drawing Figures

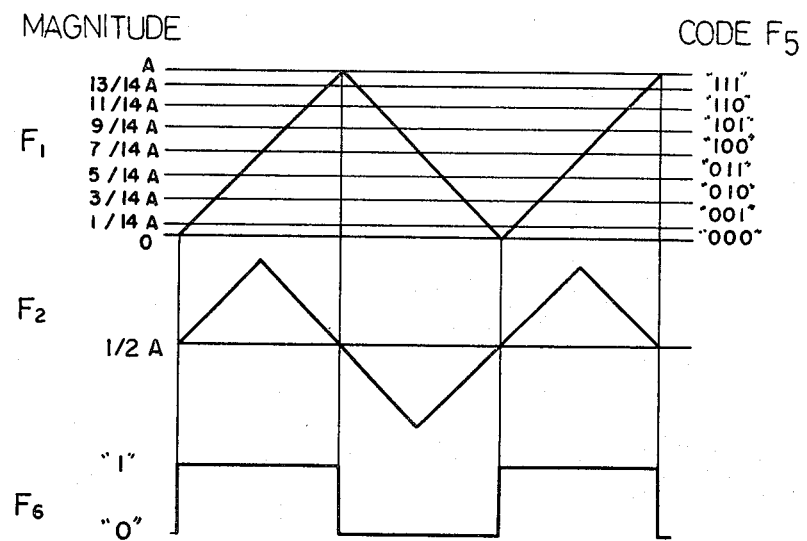

DRIVE APPARATUS

BACKGROUND OF THE INVENTION

The present invention relates to a drive apparatus for moving an object at a speed which is a predetermined function of time. The movement of the object may be rotary or reciprocating (linear or rotary).

Such drive systems have been developed which control speed in accordance with a phase difference between periodic command and actual speed signals. The control is very accurate since it is independent of the position of the object. A typical system of this type is disclosed in Japanese application No. 53-101852.

The problem which has heretofore remained unsolved is that the system has required expensive and complicated circuitry including adders, subtractors, comparators, discriminators, switches, etc. Another problem is the large number of circuit elements which require periodic fine adjustment.

SUMMARY OF THE INVENTION

A drive apparatus embodying the present invention for moving an object at a command speed which is a predetermined function of time includes a motor for moving the object, command signal generator means for generating a periodic digital command signal having an instantaneous period corresponding to the command speed and feedback signal generator means for generating a periodic digital feedback signal having an instantaneous period corresponding to an actual speed of the object, and is characterized by comprising memory means for receiving the command and feedback signals in combination as an address input, the memory means storing in addresses thereof digital drive signals having magnitudes which are predetermined in accordance with a phase difference between the respective command and feedback signals, and drive means for energizing the motor in accordance with a magnitude of the drive signal addressed in the memory means.

In accordance with the present invention, an object is moved by a motor at a command speed which is a desired function of time. The current applied to the motor is controlled in accordance with the phase difference between a periodic digital command speed signal and a periodic digital actual speed feedback signal. The two digital signals are applied in combination as an address input to a memory which stores in the addresses thereof digital drive signals having magnitudes which are predetermined in accordance with the phase difference. The current applied to the motor is proportional to the magnitude of the addressed drive signal. It is an object of the present invention to provide an improved drive apparatus which utilizes greatly simplified and inexpensive circuitry compared to the prior art.

It is another object of the present invention to provide an improved drive apparatus which comprises relatively few elements which require adjustment.

It is another object of the present invention to provide a generally improved drive apparatus.

Other objects, together with the foregoing, are attained in the embodiment described in the following description and illustrated in the accompanying drawing.

BRIEF DESCRIPTION OF THE DRAWING

FIG. 8 is a timing diagram illustrating operation on the output signals of the sensor arrangement;

FIG. 9 is a diagram illustrating data storage in a memory of the apparatus;

DESCRIPTION OF THE PREFERRED EMBODIMENT

While the drive apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
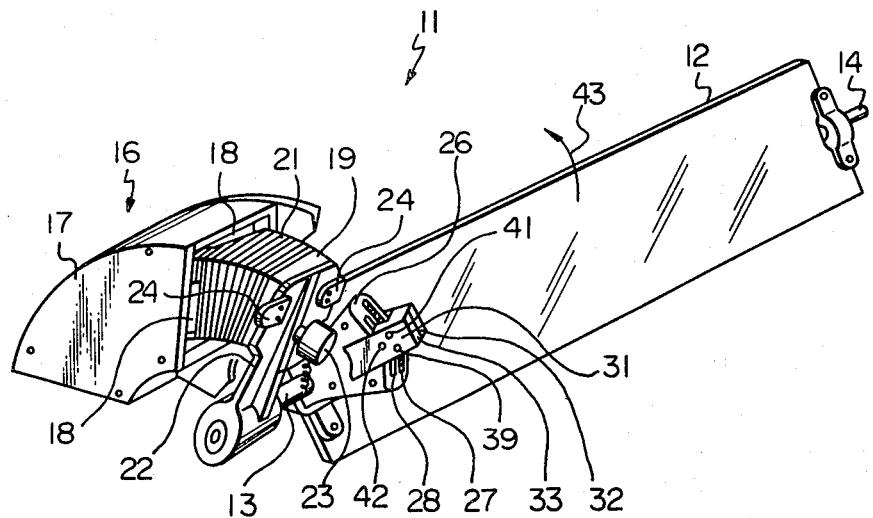
FIG. 1 is a perspective view of the mechanical components of a drive apparatus embodying the present invention.

Referring now to FIG. 1 of the drawing, a drive apparatus embodying the present invention is generally designated by the reference numeral 11 and comprises a mirror 12 which is fixed to stub shafts 13 and 14. The mirror 12 is part of an exposure system for an electrostatic copying machine and functions to scanningly reflect a light image of an original document onto a photoconductive drums, although the elements of the copying machine are not the subject matter of the present invention and are not illustrated. Although the present invention is described and shown as being applied to rotary rocking movement, it will be understood that the present invention is not so limited and may be applied to continuous rotary movement or linear reciprocating movement.

A movable coil type are motor 16, which is a linear motor, comprises a housing 17 and permanent magnets 18 fixed to the inside of the housing 17. A bobbin 19 has a coil 21 wound therearound and is free to move in and out of the housing 17. The external end of the bobbin 19 is fixed to the end of an arm 22 which is fixed at its inner end to the shaft 13.

An electromagnet 23 is mounted in a fixed position in the apparatus 11 and may be energized to hold plates 24 which are fixed to the arm 13 and thereby maintain the arm 13, mirror 12, etc. in a home position in which the bobbin 19 is extended to a maximum extent.

Figure 2:
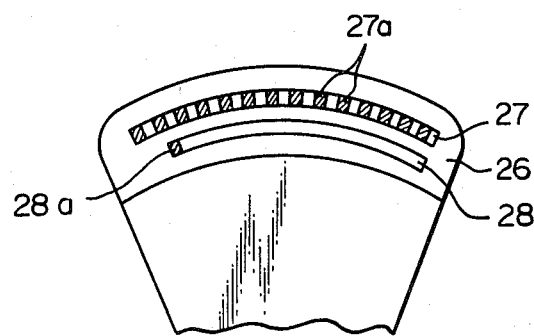
FIG. 2 is an elevational view of a clock plate of the apparatus.

Further fixed to the shaft 13 is a clock plate 26 which is shown in greater detail in FIG. 2. The clock plate 26 is formed with an outer sector 27 and an inner sector 28. The outer sector 27 is basically transparent but is formed with a plurality of opaque marks 27a. The inner sector 28 is transparent and formed with a single opaque home mark 28a. The center of gravity of the entire arrangement which is rotatable about the shafts 13 and 14 coincides with the axis of the shafts 13 and 14.

Figure 3:
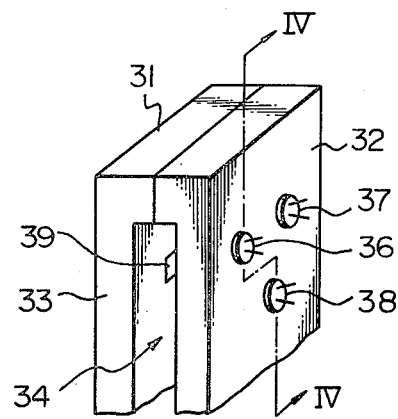
FIG. 3 is a perspective view of a sensor arrangement of the apparatus.
Figure 4:
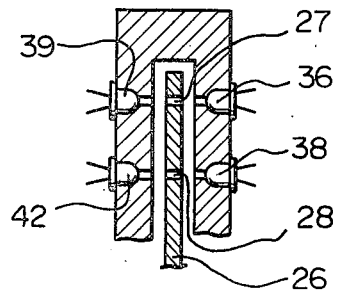
FIG. 4 is a section of the sensor arrangement taken on a line IV—IV of FIG. 3.

A sensor block 31 which is shown in FIGS. 3 and 4 is fixed in position. The sensor block 31 is formed of two L-shaped plates 32 and 33 which define a groove 34 therebetween. The clock plate 26 is movable in the groove 34.

Light sources 36 and 37 in the form of light emitting diodes (LED) are mounted in holes in the plate 32 adjacent to the sector 27. A light source or LED 38 is mounted in another hole in the plate 32 and faces the sector 28. Phototransistors 39, 41 and 42 are mounted in holes in the plate 33 and face the LEDs 36, 37 and 38 respectively.

Figure 6:
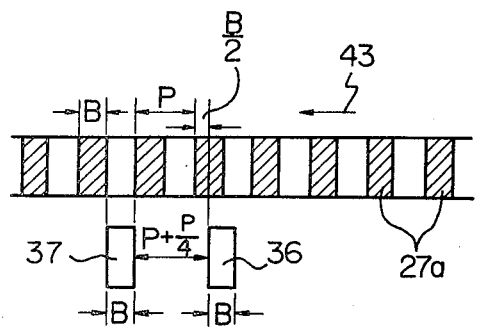
FIG. 6 is a diagram illustrating the relationship between marks on the clock plate.

The arrangement of the LEDs 36 and 37 is shown in FIG. 6 with respect to the marks 27a in the sector 27. Assuming that the opaque marks 27a and the transparent areas therebetween have equal widths designated as B and that the distance or pitch between the marks 27a is designated as P, then P=2B. The light sources 36 and 37 and thereby the phototransistors 39 and 41 are spaced apart by a distance nP+B/2, or nP+P/4, where n is an integer. In FIG. 6, n=1.

Figure 7:
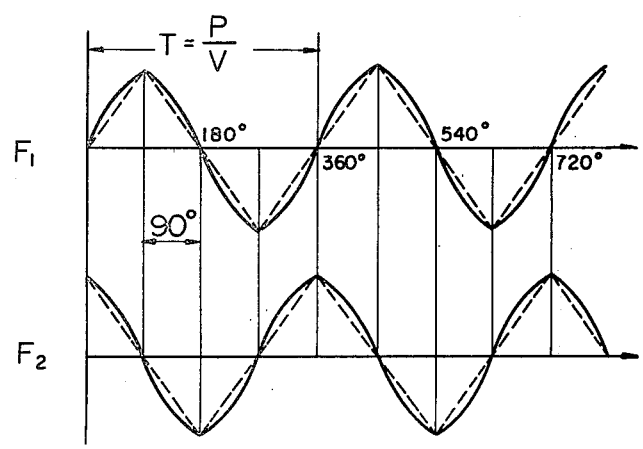
FIG. 7 is a timing diagram illustrating the output of the sensor arrangement.

For scanning, the shaft 13, mirror 12 and clock plate 26 are moved in the direction of an arrow 43 from the home position. The phototransistors 39 and 41 produce periodic quasisinusoidal analog feedback signals F1 and F2 which are illustrated in FIG. 7. Due to the arrangement of the light sources 36 and 37 and phototransistors 39 and 41, the signal F2 leads the signal F1 in phase by 90°. The frequency of the signals F1 and F2 is directly proportional to the actual rotational speed of the clock plate 26. The period of the signals F1 and F2 is designated as T and is inversely proportional to speed of the clock plate 26 which is designated as V. The exact relationship is T=P/V.

Preferably, the signals F1 and F2 are made to approximate triangular waves as much as possible as shown in broken line in FIG. 7. This may be accomplished by minimizing the width of the groove 34, providing the holes in which the phototransistors 39 and 41 are mounted with suitable shapes, etc.

Figure 5:
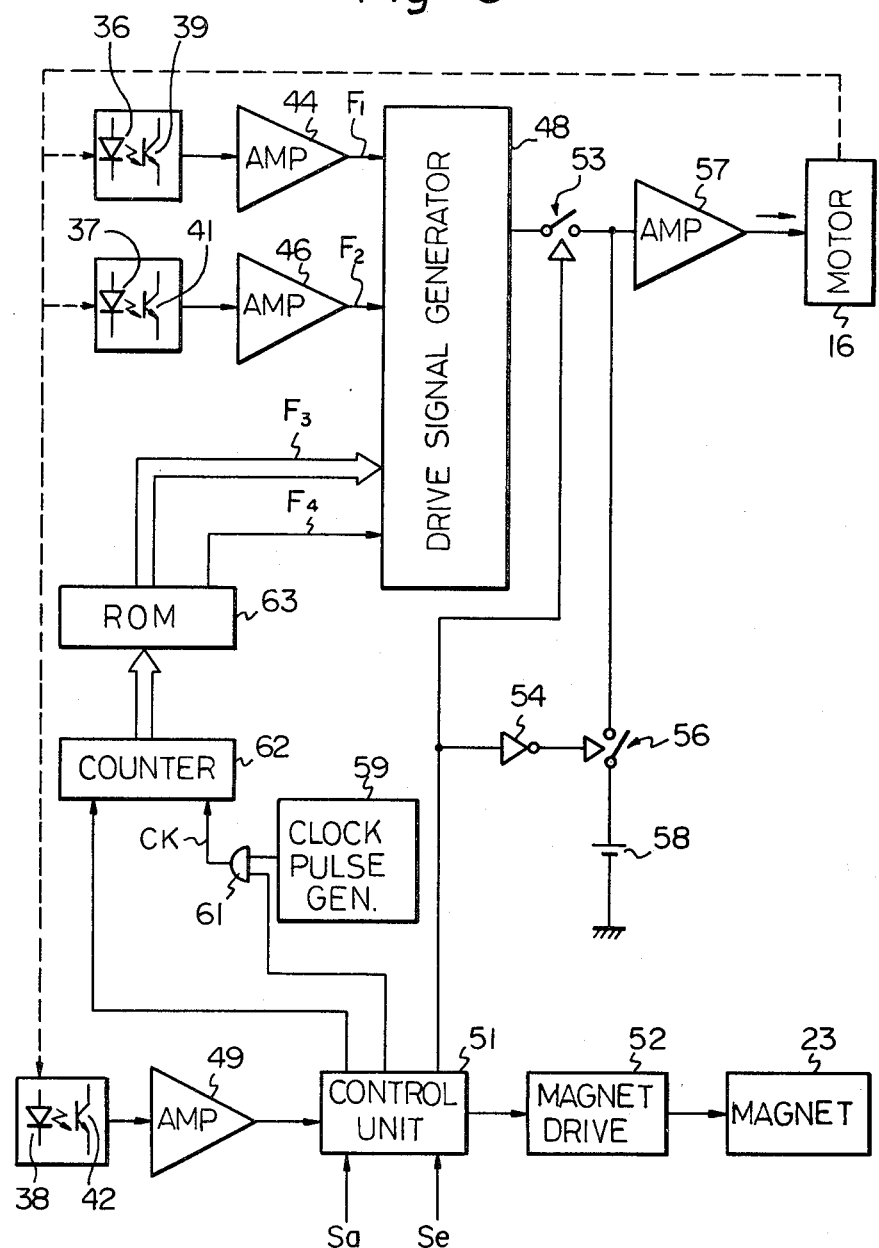
FIG. 5 is a block diagram of the present apparatus.

Referring now to FIG. 5, the phototransistors 39 and 41 are connected through amplifiers 44 and 46 respectively to a drive signal generator 48. The phototransistor 42 is connected through an amplifier 49 to a control unit 51. An output of the control unit 51 is connected through a magnet drive unit 52 to the magnet 23. An S1 output of the control unit 51 is connected to a switch 53 and through an inverter 54 to a switch 56. When closed, the switch 53 connects the output of the drive signal generator 48 through an amplifier 57 to the coil 21 of the motor 16. When closed, the switch 56 connects a positive reverse power source 58 through the amplifier 57 to the motor 16.

The output of a clock pulse generator 59 and an S2 output of thecontrol unit 51 are connected to inputs of an AND gate 61, the output of which is connected to a count input of a counter 62. A clear pulse output CP of the control unit 51 is connected to a clear or reset input of the counter 62. The output of the counter 62 is connected in parallel to an address input of a read only memory (ROM) 63, the output of which is connected to the drive signal generator 48. The output of the memory 63 comprises four bits. The first bit is a command direction bit and is designated as F4. The remaining three bits are command magnitude bits designated as F3.

Figure 11:
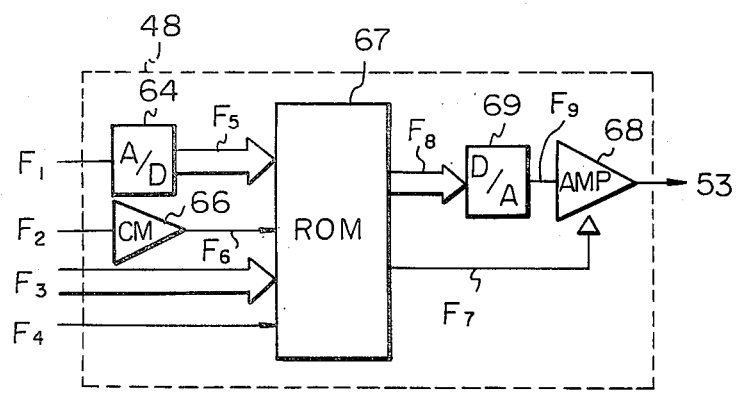
FIG. 11 is a block diagram illustrating a drive signal generator arrangement of the present apparatus.

The drive signal generator 48 is shown in FIG. 11 as comprising an analog to digital converter 64 which converts the analog signal F1 into a three bit binary feedback signal F5 which corresponds to the magnitude of the signal F1. The signal F2 is applied to a comparator 66 which produces a high feedback direction bit output F6 when the magnitude of the signal F2 is greater than A/2 and a low output when the magnitude of the signal F2 is lower than A/2. Designated as A is the peak to peak amplitude of the signal F2.

The feedback direction bit output F6 of the comparator 66, the three bit feedback signal F5 from the converter 64, the command direction bit signal F4 and the command signal F3 from the ROM 63 are applied in combination as an eight bit address to an ROM 67. The ROM 67 produces an eight bit output which consists of one drive direction bit F7 and seven drive magnitude bits F8. The bit F7 is applied to an invert/not invert input of an amplifier 68. The signal F8 is converted to analog form by a digital to analog converter 69 to constitute an analog motor drive signal F9 and is applied to the input of the amplifier 68.

The operation of the apparatus 11 begins with a start signal Sa being fed to the control unit 51. In response, the control unit 51 feeds the clear pulse CP to the counter 62 to reset the same to the count of zero. Then, the control unit 51 de-energizes the magnet 23 and makes the signals S1 and S2 high. The high S1 signal closes the switch 53 and opens the switch 56, thereby connecting the output of the drive signal generator 48 to the input of the amplifier 57. The high signal S2 enables the AND gate 61 so that the clock pulses from the generator 59 are gated therethrough to the counter 62. The counter 62 increments in response to the clock pulses and the parallel output of the counter 62 is applied to the ROM 63 as an address input. In this manner, successively higher memory locations or addresses are addressed in response to the clock pulses.

Figure 10:
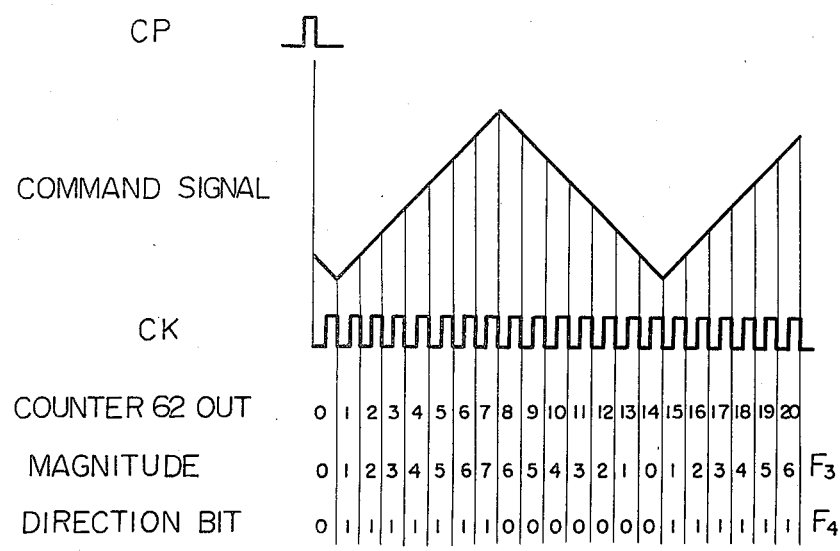
FIG. 10 is a diagram illustrating generation of a command signal in accordance with the present invention.

Each address in the memory 63 stores a four code which constitutes a digital command signal consisting of the command direction bit F4 and three magnitude bits F3. FIG. 10 illustrates the clock pulses, the count in the counter 62, the magnitude (in decimal form for simplicity) of the binary three bit code F3 and the direction bit F4. Further illustrated are the clear pulse CP and, as the upper curve in the drawing, a triangular waveform corresponding to the signals F3 and F4. The command signal is periodic with the magnitude ranging from zero to seven. The direction bit is one when the magnitude of the command signal is increasing and zero when the magnitude of the command signal is decreasing. The period of the command signal indicated by the signals F3 and F4 proportional to the speed at which the mirror 12 should be moving. It will be noted that the command signal can have the same magnitude at points where the magnitude is increasing and decreasing. The direction bit F4 eliminates this ambiguity from the command signal.

The analog signals F1 and F2 are shown in FIG. 8. In accordance with an important feature of the present invention, the magnitude of the signal F2 is greater than A/2 when the magnitude of the signal F1 is increasing and vice-versa. Thus, the signals F5 and F6 contain the same information as the signals F3 and F4 but represent the actual speed of the mirror 12 rather than the command speed. The phase difference between these signals indicates whether the mirror 12 is moving at the command speed or whether it is moving slower or faster than the command speed. If the phase of the actual or feedback speed signals F5 and F6 leads the phase of the command speed signals F3 and F4, the mirror 12 is moving too fast, and vice-versa.

The signals F3 to F6 are applied in combination to the ROM 67 as an eight bit address. The eight bit address enables separate designation of up to 256 memory locations in the memory 67. At each memory location or address is stored a digital drive signal which is precalculated in accordance with the phase difference between the command and feedback signals which constitute the address input. For example, if the mirror 12 is moving too fast, the drive signal will control the motor 16 to decelerate the mirror 12 and vice-versa. The arrangement of the memory 67 is illustrated in FIG. 9.

The drive signal has eight bits including the direction bit F7 and seven magnitude bits F8. Assuming that negative current applied to the motor 16 causes the mirror 12 to move in the direction of the arrow 43 (the forward direction), the direction bit F7 will be high when the mirror 12 is moving too fast. This causes the amplifier 68 to operate in the non-inverting mode and apply positive current to the motor 16 to decelerate the mirror 12 in accordance with the magnitude of the signal F9. If the mirror 12 is moving too slow, the direction bit F7 will be zero and will cause the amplifier 68 to operate in the inverting mode and apply negative current to the motor 16 to speed up the mirror 12 in accordance with the magnitude of the signal F9. In this manner, the motor 16 is controlled to rotate the shafts 13 and 14 and mirror 12 at the correct speed by applying corrections calculated as functions of the instantaneous phase difference between the command and actual speed signals. This control is extremely accurate.

The novel arrangement of the ROM 67 makes it unnecessary to provide complicated addition, subtraction, phase discrimination and other circuitry since the calculations have been made in advance and stored in the ROM 67. Furthermore, the apparatus 11 does not require adjustment of numerous elements as is required in the prior art.

The mirror 12 is moved from the home position in the direction of the arrow 43 under phase difference control as described above for scanning the original document. When the mirror 12 has reached the limit of its scan range, the end signal Se is produced and the control unit 51 makes the signals S1 and S2 go low. The low signal S2 opens the switch 53 and closes the switch 56 to connect the power source 58 to the amplifier 57. This causes the mirror 12 to move in the reverse direction (opposite to the arrow 43) back to the home position. When the mirror 12 reaches the home position, the phototransistor 22 senses the home mark 28a and produces a high output which causes the control unit 51 to energize the electromagnet 23 through the magnet drive 52 and hold the arm 22 and mirror 12 in the home position.

In summary, it will be seen that the present invention provides a novel and useful drive apparatus for moving an object at predetermined instantaneous speed which is determined as a function of distance and time, or $x = \theta = f(t)$, where x is scalar displacement along the path of movement, $\theta$ is the rotational displacement and f(t) is the desired function of time. Various modifications will become possible for those skilled in the art after receiving the teachings of the present disclosure without departing from the scope thereof. For example, the number of possible combinations of the drive signal may be 32 or some other number rather than 256. Another modification is to control the drive signal generator 48 to produce a zero signal or open both switches 53 and 56 at the limit of movement of the mirror 12 and let the mirror 12 coast for a short distance due to inertia before applying the reverse drive current.

What is claimed is:

1. A drive apparatus for moving an object at a command speed which is a predetermined function of time including a motor for moving the object, command signal generator means for generating a periodic digital command signal having an instantaneous period corresponding to the command speed and feedback signal generator means for generating a periodic digital feedback signal having an instantaneous period corresponding to an actual speed of the object, characterized by comprising:

memory means for receiving the command and feedback signals in combination as an address input, the memory means storing in addresses thereof digital drive signals having magnitudes which are predetermined in accordance with a phase difference between the respective command and feedback signals; and drive means for energizing the motor in accordance with a magnitude of the drive signal addressed in the memory means.

2. An apparatus as in claim 1, in which the command signal comprises a command direction bit which has a first logical sense when a magnitude of the command signal is increasing and a second logical sense when the magnitude of the command signal is decreasing, the feedback signal comprising a feedback direction bit which has the first logical sense when a magnitude of the feedback signal is increasing and the second logical sense when the magnitude of the feedback signal is decreasing.

3. An apparatus as in claim 2, in which the command signal generator means comprises a clock pulse generator, a counter which is incremented by clock pulse from the clock pulse generator and memory means connected to receive an output of the counter as an address input and storing command signals in addresses therein.

4. An apparatus as in claim 2, in which the feedback signal generator means comprises sensor means for producing first and second periodic analog signals having instantaneous periods corresponding to the actual speed of the object, the second analog signal being advanced in phase by 90° relative to the first analog signal, analog to digital conversion means for converting the first analog signal into digital form and comparator means for producing the feedback direction bit with the first logical sense when a magnitude of the second analog signal is above a predetermined value and with the second logical sense when the magnitude of the second analog signal is below the predetermined value, the predetermined value being one half a peak to peak magnitude of the second analog signal.

* * * * *